Oct. 22, 1957  R. G. SMITH  2,810,494
PRESSURE SEAL
Filed March 29, 1954  2 Sheets-Sheet 1

INVENTOR.
RUSSELL G. SMITH
BY
Zugelter & Zugelter
Attys.

Oct. 22, 1957   R. G. SMITH   2,810,494
PRESSURE SEAL

Filed March 29, 1954   2 Sheets-Sheet 2

INVENTOR.
RUSSELL G. SMITH
BY
Zugelter & Zugelter
Attys.

United States Patent Office 2,810,494
Patented Oct. 22, 1957

2,810,494

PRESSURE SEAL

Russell G. Smith, Cincinnati, Ohio, assignor to The Wm. Powell Company, Cincinnati, Ohio, a corporation of Ohio Application March 29, 1954, Serial No. 419,454

5 Claims. (Cl. 220—46)

This invention relates to high pressure seals, and more particularly to an annular sealing structure between a valve body or housing, and the valve bonnet of a valve for high pressure lines.

An object of this invention is to provide an annular seal which can withstand high pressures, yet can readily be disassembled and reassembled.

A further object of this invention is to provide a seal which is implemented by pressure on the bonnet of the valve.

Another object of this invention is to provide a seal for valves of the above type, which has a double, wide area of sealing rather than a hair line seal as on present pressure sealing devices.

A further object of this invention is to provide a seal for a valve of this type, in which the sealing gasket is of triangular shape in cross section and the top and bottom edges of the gasket are tapered so that the bottom edge is approximately V-shape in cross section and the top edge is of approximately inverted V-shape in section, and having bonnet and pressure ring surfaces so arranged as to urge both ends of the gasket out against the sealing surface of the neck of the valve body or housing. This arrangement thus compensates for any out of round condition in the neck of the valve body which may occur when the valve is subjected to drastic temperature changes.

From the following detailed description and the drawing, the above and other objects and features of this invention will be apparent to those having ordinary skill in the art to which the invention pertains.

Figures 1, 2:
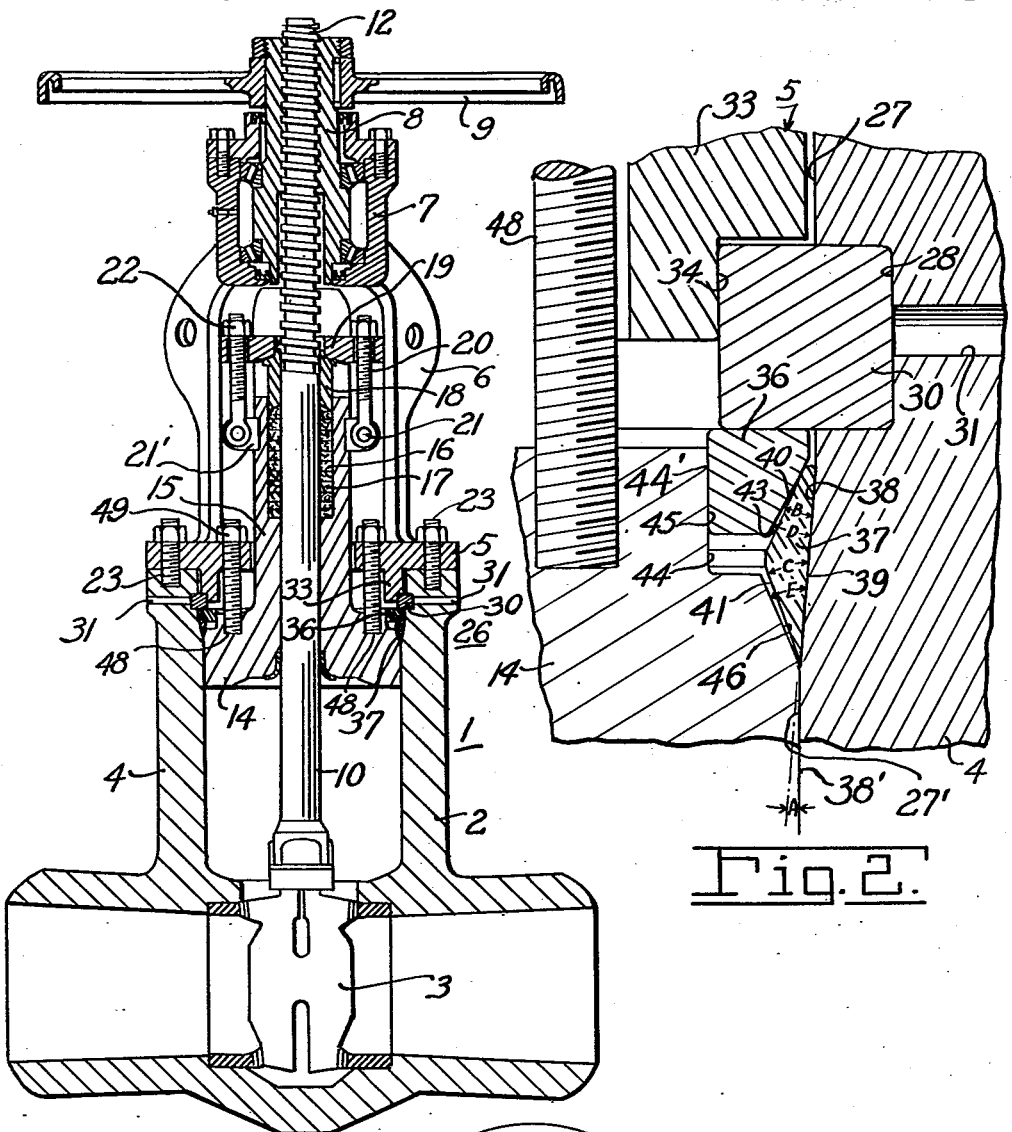
Figure 1 is a view in longitudinal section, showing a valve provided with a seal constructed in accordance with an embodiment of this invention.
Fig. 2 is an enlarged view in section, showing details of the sealing structure.
Figure 3:
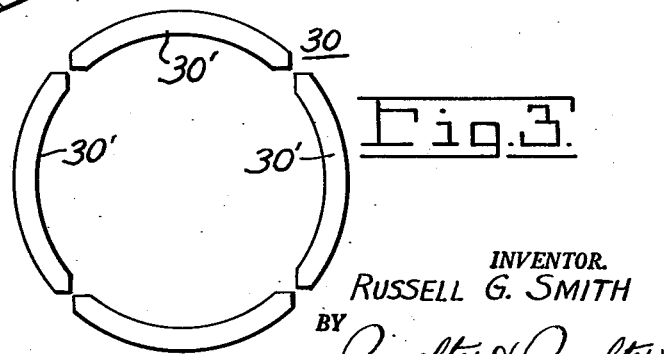
Fig. 3 is a plan view showing a segmental thrust ring which serves to hold down a pressure ring of the sealing structure, the thrust ring being removed from the valve.

In the drawings a gate valve 1 of the high pressure type is illustrated. The valve comprises a body or housing 2 having therein a wedge or gate 3 for opening and closing the valve, and a neck 4 integral with the body. The valve neck is closed by a yoke or cover 5. Integral with the yoke 5 is an open frame or cage 6 having at the top thereof a housing 7 in which a nut 8 is rotatably mounted, but secured against longitudinal movement. A hand wheel 9 is secured to the nut by means of which the nut may be rotated in one direction or the other.

The gate or wedge 3 may be raised to open the valve, or lowered to close the same, by means of a stem 10 that is coaxial with and extends upwardly through the neck. The upper end of the stem is threaded, as at 12, to receive nut 8. Thus, when the wheel 9 is turned, the stem 10 travels upwardly through the nut, or downwardly, as the case may be, depending upon the direction in which the wheel is turned.

Within the neck 4 is a bonnet 14. The bonnet 14 is substantially cylindrical in shape. The bonnet has a central bore in which the stem 10 operates, as shown. Extending upwardly from an integral with the bonnet 14 is a cylindrical or tubular upper portion 15. The upper portion 15 of the bonnet is provided with a packing box in which packing 17 is retained. A cylindrical member 18 extends into the packing box 16 and bears on top of the packing therein. The cylindrical member 18 is forced down on the packing by means of a bearing member 19 and a plurality of bolts 20 that are hingedly secured on hinge pins 21 of a collar 21' secured to the upper portion 15 of the bonnet. As shown, the bearing member 19 is provided with bolt holes for receiving the hinge bolts 20, so that when nuts 22 are tightened, the member 19 is forced down on the member 18, thereby putting the packing in the packing box under sufficient compression to provide a seal between the stem and the packing.

The yoke 5 as shown, is secured to the upper end of the valve neck 4 by means of studs 23. In order to provide a pressure-tight seal between the bonnet and the neck, a sealing structure 26 is provided. The sealing structure is illustrated in enlarged scale in Fig. 2.

As shown in Fig. 2, the upper end portion of the neck 4 has an interior cylindrical surface 27 at the open end of the neck and another interior cylindrical surface 27' spaced inwardly of the neck therefrom. The diameter of the surface 27 is greater than the diameter of the surface 27'. An annular groove 28 is formed in surface 27 to receive a segmental thrust ring 30. The segments are inserted in the annular groove 28 from within the neck of the valve, and they may be removed therefrom by means of knockout pins (not shown) inserted through knockout holes 31 in the upper portion of the valve neck, as shown. The segments, when assembled in the annular notch 28, form a substantially continuous annular thrust ring.

As shown in Fig. 1, the yoke 5 is provided with an annular depending rib 33 having on its outer face a right-angled groove 34 (Fig. 2) that is concentric with the annular groove 28 and aligns the inner portion of the thrust ring segments 30.

The seal 26, below the thrust ring 30, is formed by a bearing ring 36, a gasket ring 37, and opposed surfaces on the bonnet and valve neck. Gasket 37 is preferably made of a relatively soft metal, while bearing ring 36 is formed of hard, rigid metal. In a preferred form, the body 2 and bonnet 14 may be formed of steel or a low alloy steel having moderate hardness, for example, a Brinnel hardness of 135–200. The gasket 37 is preferably formed of softer material than the bonnet and body, for example, the gasket 37 may be of soft annealed iron preferably having a Brinnel hardness of approximately 80. The bearing ring 36 is formed of hard rigid metal, for example, hardened stainless steel having a Brinnel hardness of 250 to 400. However, where high pressures and temperatures or corrosive conditions are encountered, all parts may be made of the same material, such as austenitic or stainless steel.

As shown in Fig. 2, the gasket 37 bears against the wall of the neck 4 immediately below the upper cylindrical portion 27 thereof. In the area where the outer face of gasket 37 contacts the interior of the neck, the neck wall surface is formed as the frustum of an inverted cone, thereby providing a frusto-conical surface 38. The angle A of that surface with a line 38' in the cylindrical surface 27' and parallel to the axis of the valve, should be relatively small, and in practice I prefer that the angle be about five degrees, as shown. Since the surface 38 is tapered, the gasket seating surface may be lapped after the valve has been in service to provide a smooth and true gasket seating surface.

The outer or face surface 39 of the gasket ring 37 is tapered to the angle at the frusto-conical surface 38 of the neck. The inner wall of the gasket 37 has two inclined faces, an upper face 40 and a lower face 41. The faces 40 and 41 may be substantially equal in area.

In practice, it is preferred that the angle B between face 40 and the outer face 39 of the gasket 37 be an acute angle of about 25°, and that the angle C between face 41 and the outer face 39 of the gasket be an acute angle of about 25°. Thus, the angle between the cylindrical surface 27 and gasket face 40 is an acute angle of approximately 30° and the angle between the gasket face 41 and the cylindrical surface 27' is approximately 20°.

The seal areas are formed at the faces 39 and 41 of the gasket and at faces 38 and 46 of the neck and bonnet, respectively. As may be seen in Fig. 2, the bearing ring 36 is provided with an inclined face 43 that contacts the upper edge portion of the face 40 of the gasket. In practice, the angle D between the face 43 of the bearing ring and the face 38 of the neck, is made greater than the angle between the face 40 and the face 38. It is preferred that this difference in angle be approximately 3°. In other words, the angle D between the face 43 and the face 38 is about 28°, and the angle between the face 43 of the bearing ring and the axis thereof is approximately 33°.

As shown in Fig. 2, the bonnet 14 is provided with an annular shoulder 44 into which the bearing ring fits. The inner face 44' of the bearing ring 36 engages a face 45 of the bonnet to align and support the bearing ring with the bonnet.

The bonnet 14 is provided with a frusto-conical surface 46 below the annular shoulder 44 and opposite the lower portion of the neck face 38, or opposite the face 41 of the gasket. The angle E between face 38 and face 46 is approximately 28° by preference. The angle between face 41 and face 46, is, by preference, approximately 3° and the angle between the face 46 of the bonnet and the axis thereof is approximately 23°.

When the valve bonet is installed in the neck, as shown, and yoke 5 has been placed and bolted down, the bonnet is pulled up against the gasket 37 by means of studs 48 (Fig. 1) extending through the inner edge of the cover 5 and into the bonnet and nuts 49 on the studs. The studs 48 are drawn up, initially, to such extent that positive engagement is effected between the face 43 of the bearing ring 36, and face 40 of the gasket, and between face 46 of the bonnet and face 41 of the gasket. The components of the forces applied to the gasket by the ring 36 and bonnet in directions normal to the gasket faces 40 and 41 of the gasket, force the gasket tightly against the neck seat or face 38. Therefore, a relatively long sealing contact is formed between the gasket and neck seat, and substantially line contact seats are formed between the bonnet and gasket and the pressure ring and gasket.

When the gate valve is subjected to pressure, the pressure of the steam or other fluid in the valve acts on the lower face of the bonnet, tending to force it against the gasket 37. The force exerted outwardly on the bonnet is transmitted to the lower edge of the gasket 37, causing the gasket to be forced upwardly into the crotch between the faces 43 and 38 of the bearing ring and neck, respectively, and also into the crotch between faces 46 and 38 of the bonnet and neck. The pressure of the media as thus applied to the bonnet, therefore, develops a substantially line contact between the faces 43 and 40 of the bearing ring 36 and gasket, and a substantially line contact seal between the face 46 of the bonnet and the face 41 of the gasket. The greater the pressure applied to gasket 37, the tighter the seal will be between the gasket 37 and the body neck 4 adjacent the upper and lower edges of the surface 38 of the body neck.

Since gasket 37 is of relatively soft metal, and since it is confined between the faces 43 and 46 of the ring 36 and bonnet 14, respectively, and the face 38 of the neck, the metal will be confined to its intended location, namely, at the place where the points and areas of sealing are to be effected.

The angles A, B, C, D, and E of Fig. 2 between the sealing surfaces may be varied. The angle A is preferably a relatively small angle of approximately 5° but good results may be obtained when the angle A is between 5° and 15°. The angles B and C may vary from 15° to 45° while the angles D and E may be from 1° to 5° larger than the angles B and C, respectively.

Figure 4:
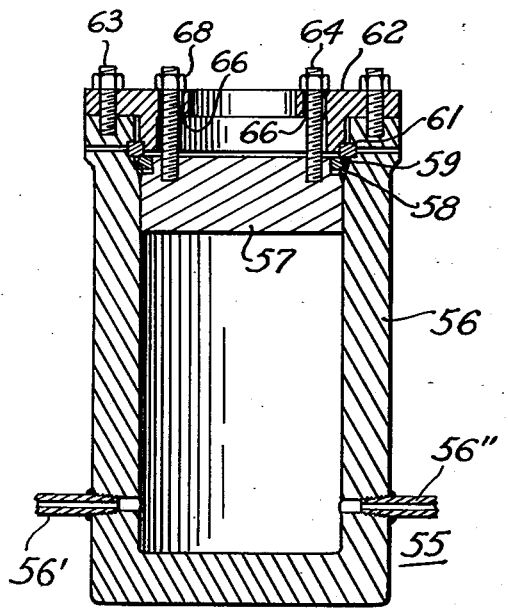
Fig. 4 is a view in transverse section showing a pressure vessel provided with a seal constructed in accordance with another embodiment of this invention.

In Fig. 4 is shown a pressure vessel 55 having a seal constructed in accordance with this invention. The pressure vessel 55 includes a hollow body 56. The body may be provided with an inlet tap 56' and an outlet tap 56". The open end of the body 56 is closed by a floating closure member 57. A gasket 58 forms a seal between the body 56 and the closure member 57.

As shown, the gasket engages a bearing ring 59. The ring 59 in turn engages a segmental thrust ring 61. The gasket 58, bearing ring 59, and thrust ring 61 may be of the same construction as the corresponding members of the valve already described.

A cover ring 62 is attached to the upper edge of the body 56 by means of studs 63. Studs 64 are mounted in the closure member 57 and extend through openings 66 in the cover ring 62.

The closure member 57 is placed in the open end of the body 56. The gasket ring, bearing ring, and thrust ring segments are then positioned and the cover ring is mounted on the body with the studs 64 projecting through the openings 66 in the cover ring. Nuts 68 are mounted in the studs 64 and the nuts are tightened to bring the closure member firmly against the gasket to form an initial seal. Then when the interior of the vessel is subjected to pressure, the pressure inside the vessel acts on the closure member to reinforce the seal.

The illustrated embodiments of the invention are subject to structural variations and changes without departing from either the spirit or the scope of the invention, as defined in the appended claims.

Therefore, what is claimed as new and desired to be secured by Letters Patent is:

1. A high pressure sealing structure which comprises a hollow housing having an outwardly extending tubular neck, said neck having spaced cylindrical interior surfaces at its inner and outer end portions; said inner surface being of lesser diameter than the outer surface, and a frusto-conic face between and joining the adjacent ends of said cylindrical surfaces, a closure member inside of and slidable along said neck, said closure member having a frusto-conic outer face that diverges from the frusto-conic face of the neck whereby an annular groove of V-shape in section is formed between them, an annular gasket of yieldable material, said gasket having an outer frusto-conic face which engages flatwise with the frusto-conic face of the neck, and a pair of frusto-conic inner faces, the inner faces of the gasket intersecting the outer face at equal angles, one of the inner faces forming with the outer face an annular edge which is received in the annular V-shaped groove formed by the frusto-conic faces of the neck and closure member, an annular pressure ring mounted inside and freely slidable axially of said neck, said pressure ring having a frusto-conic face which diverges from the frusto-conic face of the neck, whereby another annular groove of V-shape in section is formed therebetween, the other inner frusto-conic face of the gasket forming with the outer face of the gasket an annular edge which is received in the other V-shaped groove, the angles of the grooves in section being equal, the pressure ring engaging the other inner face of the gasket at a location adjacent the junction between the outer face and said other inner face, a retaining ring secured to the neck and engaging the pressure ring, and means for pulling the closure member against the gasket ring, the pressure exerted thereby on the gasket ring being transmitted through the pressure and retaining rings to the neck.

2. A high pressure sealing structure which comprises a hollow housing having an outwardly extending tubular neck, said neck having spaced cylindrical interior surfaces at its inner and outer end portions, said inner surface being of lesser diameter than the outer surface, and a frusto-conic face between and joining the adjacent ends of said cylindrical surfaces at an angle of 5° to 15° to the axis of the neck, a closure member inside of and slidable along said neck, said closure member having a frusto-conic outer face opposite the frusto-conic face of the tubular neck expanding toward the interior of the housing, the frusto-conic faces forming an annular groove of V-shape in section, an annular gasket of yieldabe metal, said gasket having an outer frusto-conic face which engages flatwise with the frusto-conic face of the neck and a pair of frusto-conic inner faces forming, with the outer face, a pair of edges of V-shape in section, the angle between the outer face and each of the inner faces of the gasket being between 15° and 45°, one of said edges of the gasket being disposed in said groove, an annular pressure ring mounted inside said neck and slidable along the neck, said pressure ring having a frusto-conic face which forms an angle with the frusto-conic face of the neck in which the other of said edges of the gasket is received, the pressure ring engaging one of the inner faces of the gasket at a location adjacent said other edge, the angle between the frusto-conic face of the neck and the frusto-conic face of the closure member being equal to the angle between the frusto-conic face of the neck and the frusto-conic face of the pressure ring and being 1° to 5° larger than the aforementioned angles between the gasket faces, a retaining ring secured to the neck and engaging the outer end of the pressure ring, and means for pulling the closure member against the gasket ring, the pressure exerted thereby on the gasket ring being transmitted through the pressure and retaining rings to the neck.

3. A pressure sealing structure for a high pressure valve having a hollow valve body, a tubular neck, and a bonnet within said neck which comprises spaced cylindrical interior surfaces at the inner and outer end portions of the neck, said inner surface being of lesser diameter than the outer surface, an annular frusto-conic face between and joining adjacent ends of said cylindrical surfaces, said bonnet having an annular frusto-conic surface that diverges from the frusto-conic face of the neck whereby an annular groove of substantially V-shape in section is formed between them, an annular gasket, said gasket having an outer frusto-conic face which engages flatwise with the frusto-conic face of the neck and a pair of frusto-conic inner faces, the inner faces of the gasket intersecting the outer face at equal angles, one of the inner faces of the gasket forming with the outer face an annular edge which is received in the annular V-shaped groove formed by the frusto-conic faces of the neck and bonnet, an annular pressure ring in and freely slidable axially of said neck and having a frusto-conic outer face which diverges from the frusto-conic face of the neck, whereby another groove of V-shape in section is formed therebetween, the other inner frusto-conic face of the gasket forming with the outer face of the gasket an annular edge which is received in the other V-shaped groove, the angles of the grooves in section being equal, the pressure ring engaging the other inner face of the gasket at a location adjacent the junction between the outer face and said other inner face, a retaining ring secured to said neck and engaging the pressure ring, and means for pulling the bonnet against the gasket ring, the pressure exerted thereby on the gasket ring being transmitted through the pressure and retaining rings to the neck.

4. A high pressure sealing structure which comprises a hollow housing having an outwardly extending tubular neck, said neck having an interior frusto-conic face adjacent its open end having a greater diameter at its outer end and a lesser diameter at its inner end, a closure member inside of and slidable along said neck, said closure member having a frusto-conic outer face that diverges from the frusto-conic face of the neck, whereby an annular groove of V-shape in section is formed between them, an annular gasket of yieldable material, said gasket having an outer frusto-conic face which engages flatwise with the frusto-conic face of the neck, and a pair of frusto-conic inner faces, the inner faces of the gasket intersecting the outer face at equal angles, one of the inner faces forming with the outer face an annular edge which is received in the annular V-shaped groove formed by the frusto-conic faces of the neck and closure member, an annular pressure ring mounted inside and freely slidable axially of said neck, said pressure ring having a frusto-conic face which diverges from the frusto-conic face of the neck, whereby another annular groove of V-shape in section is formed therebetween, the other inner frusto-conic face of the gasket forming with the outer face of the gasket an annular edge which is received in the other V-shaped groove, the angles of the grooves in section being equal, the pressure ring engaging the other inner face of the gasket at a location adjacent the junction between the outer face and said other inner face, a retaining ring secured to the neck and engaging the pressure ring, and means for pulling the closure member against the gasket ring, the pressure exerted thereby on the gasket ring being transmitted through the pressure and retaining rings to the neck.

5. A pressure sealing structure for a high pressure valve having a hollow valve body, a tubular neck, and a bonnet within said neck which comprises an annular frusto-conic interior face on the neck adjacent its open end and having a greater diameter at its outer end and a lesser diameter at its inner end, said bonnet having an annular frusto-conic surface that diverges from the frusto-conic face of the neck, whereby an annular groove of substantially V-shape in section is formed between them, an annular gasket, said gasket having an outer frusto-conic face which engages flatwise with the frusto-conic face of the neck and a pair of frusto-conic inner faces, the inner faces of the gasket intersecting the outer face at equal angles, one of the inner faces of the gasket forming with the outer face an annular edge which is received in the annular V-shaped groove formed by the frusto-conic faces of the neck and bonnet, an annular pressure ring in and freely slidable axially of said neck and having a frusto-conic outer face which diverges from the frusto-conic face of the neck, whereby another groove of V-shape in section is formed therebetween, the other inner frusto-conic face of the gasket forming with the outer face of the gasket an annular edge which is received in the other V-shaped groove, the angles of the grooves in section being equal, the pressure ring engaging the other inner face of the gasket at a location adjacent the junction between the outer face and said other inner face, a retaining ring secured to said neck and engaging the pressure ring, and means for pulling the bonnet against the gasket ring, the pressure exerted thereby on the gasket ring being transmitted through the pressure and retaining rings to the neck.

References Cited in the file of this patent

UNITED STATES PATENTS

| | | |
|---|---|---|
| 2,305,590 | Marburg et al. | Dec. 22, 1942 |
| 2,426,392 | Fennema | Aug. 26, 1947 |
| 2,617,554 | Smith | Nov. 11, 1952 |
| 2,622,763 | McGregor | Dec. 23, 1952 |

FOREIGN PATENTS

| | | |
|---|---|---|
| 525,272 | Great Britain | Aug. 26, 1940 |